United States Patent
Napolitano et al.

(10) Patent No.: US 6,818,238 B2
(45) Date of Patent: Nov. 16, 2004

(54) COATED ICE CONFECTION

(75) Inventors: Guillermo E. Napolitano, Dublin, OH (US); Alain Leas, Dublin, OH (US)

(73) Assignee: Nestec S.A., Vevey (CH)

( * ) Notice: Subject to any disclaimer, the term of this patent is extended or adjusted under 35 U.S.C. 154(b) by 281 days.

(21) Appl. No.: 10/093,727

(22) Filed: Mar. 11, 2002

(65) Prior Publication Data

US 2003/0175388 A1 Sep. 18, 2003

(51) Int. Cl.$^7$ .............................. A23G 3/00; A23G 9/00
(52) U.S. Cl. ....................... 426/101; 426/306; 426/417; 426/660; 426/659; 426/565
(58) Field of Search ................. 426/101, 306, 426/417, 660, 659, 565

(56) References Cited

U.S. PATENT DOCUMENTS

| | | | | |
|---|---|---|---|---|
| 2,903,363 A | * | 9/1959 | Farr | 554/147 |
| 4,276,322 A | * | 6/1981 | Padley et al. | 426/660 |
| 4,364,868 A | * | 12/1982 | Hargreaves | 554/169 |
| 4,560,563 A | | 12/1985 | Tresser | 426/101 |
| 4,594,259 A | * | 6/1986 | Baker et al. | 426/613 |
| 5,069,915 A | * | 12/1991 | Devitt et al. | 426/93 |
| 5,939,114 A | | 8/1999 | Cain et al. | 426/101 |
| 5,958,476 A | | 9/1999 | Cain et al. | 426/68 |
| 6,110,515 A | * | 8/2000 | Clechet et al. | 426/306 |
| 6,174,555 B1 | * | 1/2001 | Leas et al. | 426/100 |
| 6,395,316 B1 | * | 5/2002 | Leas et al. | 426/101 |

FOREIGN PATENT DOCUMENTS

| | | |
|---|---|---|
| EP | 0 740 905 A1 | 11/1996 |
| EP | 0 750 844 A2 | 1/1997 |
| GB | 2 177 107 A * | 1/1987 |
| JP | 55-114261 | 9/1980 |

* cited by examiner

Primary Examiner—N. Bhat
(74) Attorney, Agent, or Firm—Winston & Strawn LLP

(57) ABSTRACT

An ice confection having an ice confection core and a fat-based outer coating layer wherein the fat in the coating is predominantly a soft type palm mid fraction. The use of the soft type palm mid fraction having a melting point of around 26° C. in a fat-based coating dramatically reduces or prevents bleed through the coating of coated ice cream products.

15 Claims, No Drawings

COATED ICE CONFECTION

FIELD OF THE INVENTION

The present invention relates to the improvement of compound coatings as defined as coatings made of vegetable fats that are different from cocoa butter, to a coated ice confection and to the production thereof, more particularly to an ice confection coated with a fat-based coating.

BACKGROUND OF THE INVENTION

Ice cream products made by molding or extrusion technologies in which a core of molded or extruded ice cream is dipped into or enrobed with a melted chocolate coating very often have a defect called bleeding. This defect is exhibited when melted ice cream seeps through the coating and leaks out at the surface thus providing an unappealing appearance. This defect is very common when the coating used contains a large proportion of lauric fats, such as coconut or palm kernel oils. The use of such lauric fats in chocolate coatings is conventional and is described for example in U.S. Pat. No. 6,210,739.

A common procedure to reduce the incidence of bleeding is to replace some of the lauric fats with soft non-lauric oils such as soybean or sunflower oil, to soften the texture and provide some flexibility to the coating. This reduces coating contraction during crystallization, a phenomenon which is believed to be a main factor in the development of bleeders. This is only a partial solution to the problem of bleeding, however, because it has the limitation that the setting time of the coating becomes very long and the resulting coating has an oilier and undesirable texture.

Another common way to decrease the bleeding of the coating is to dip the ice cream core into liquid nitrogen to achieve an extremely cold and dry surface before contacting the coating. This procedure is very cost intensive, may create safety issues and requires additional equipment. In addition, it provokes extremely rapid crystallization that may result in the formation of cracks in the ice cream coating and non-adherence of the coating to the ice cream core. Cracking and non-adherence of the coating of ice cream bars during consumption is one of the major causes for complaints from consumers because this is not only messy but also it prevents the consumer from eating the entire coating and core of the product.

Methods for improving the adhesion of fat-based coatings to ice confections using a precoating or interface layer between the ice confection and the edible fat-based coating have been proposed. WO 95/21536 discloses an ice confection having a couverture layer on at least part of its surface, the layer including a first, inner, precoating layer. The precoating layer may have a similar or a different composition to the outer couverture layer and contains from about 25% to about 100% fat. But these require an additional processing step that contributes to the production efficiency and overall cost of the products.

In addition to these problems there are technical or organoleptic related constraints. First, the coating must crystallize and become sufficiently hard to be handled for wrapping in an acceptable time. It must be used at temperatures that chocolate equipment can handle, typically between 20–40° C. Then, the coating must melt quickly in the mouth to give a good flavor release and resemble a confectionery product consumed at room temperature.

Thus there is a need for improvements in this area, and the present invention now provides improved coatings that resolve many of these problems in a simple and efficient manner.

SUMMARY OF THE INVENTION

It has now been found, surprisingly, that the use of a soft type palm mid fraction having a melting point of around 26° C. as the predominant fat in a fat-based coating dramatically reduces or prevents bleed in coated ice cream products from manufacturing through distribution.

Accordingly, the present invention provides an ice confection comprising an ice confection core and an edible fat-based outer coating layer, in which the fat of the coating comprises a soft type palm mid fraction that is present in an amount sufficient to reduce or prevent core bleed through the coating from when the ice confection is manufactured through distribution.

The present invention also provides a method for reducing or preventing pinholes in fat-based ice cream coatings or for reducing or preventing bleeding of melted ice cream from the core through the coating of a coated ice cream product. This method comprises applying a fat-based outer coating layer to an ice confection core, in which the fat of the coating comprises a soft type palm mid fraction and is present in an amount sufficient to reduce or prevent pinholes or core bleed through the coating from when the ice confection is manufactured through distribution.

DETAILED DESCRIPTION OF THE INVENTION

The ice confection may be milk- or fat-based and may be, for instance, yoghurt, ice milk or a frozen dessert. However, the invention is particularly suitable when the ice confection is ice cream. The fat-based outer coating layer is predominantly based on soft fractionated palm oil or palm mid fraction (PMF) which is obtained by double fractionation of palm oil. It may include any kind of coating with fat as the continuous phase, for example, dark, milk or white chocolate or compound coatings or various substitutes such as direct cocoa butter replacements, or any mixture thereof.

The soft PMF can be used as such or in admixture. When the soft PMF is used in admixture with other fats, it represents from 5 to 80% by weight of the fats in the coating. Preferably, the soft PMF represents at least 97% by weight of the fats in the coating. The balance of 20% by weight or preferably at most 3% by weight may consist of a hardened palm oil fraction produced by fractionation or hydrogenation.

One important advantage of the coating in the ice confection of the invention is that the overall quality of the ice cream product is dramatically improved. Direct advantages are an improvement of the appearance of the product due to reduction or even elimination of bleeding and cracking. The enhanced integrity of the coating will in turn improve the protective function of the coating and preserve the quality of the ice cream core.

In addition, upon consumption, the fat-based coating resembles chocolate at room temperature. This means that a coating predominantly containing a soft PMF, when associated with ice cream at about 0° C., melts in the mouth in a similar way as chocolate does at room temperature.

In the context of the invention, a soft-type fractionated palm oil or PMF has a slip melting point of between 22 and 30° C., preferably between 25 and 28° C., and an iodine value between 40 and 52.

The particular mixture of solid and liquid fractions present in this fat at temperatures near 0° C. prevents the development of the excessive hardening and brittleness, thus reducing the incidence of bleeding and cracking of the coating.

Thus, the solid fat content of the fat in % as measured by pulsed NMR at the temperature indicated is preferably as shown below. This measurement is made without any tempering or temperature preconditioning:

| °C. | % |
|---|---|
| 0 | 75–85 |
| 10 | 65–80 |
| 20 | 45–60 |
| 25 | 10–25 |
| 30 | 0–5 |
| 35 | 0 |

Similar fats are known and used in confectionery as centers and fillings but have not been used in ice cream coatings.

It is important in the context of the invention that the soft PMF used is of non lauric origin. With respect to its fatty acid composition it is distinct from conventionally used coating fats in that it contains predominantly $C_{16:0}$ saturated acid (palmitic acid) and $C_{18:1,n-9}$ monounsaturated acid (oleic acid), which is very different from, e.g., coconut oil which contains predominantly $C_{12:0}$ saturated acid (lauric acid).

It is also distinct from a hard PMF which is recommended for ice cream coatings in that its content in palmitic acid is lower and that of oleic acid is higher. It is furthermore distinct from cocoa butter in that this latter has a much higher content in $C_{18:0}$ saturated acid (stearic acid).

The coating comprises 5 to 80% by weight soft PMF, preferably 35–60% by weight; 20–50% by weight sugar, preferably 30–40% by weight; up to 30% by weight milk ingredients, preferably 10–20% by weight; up to 30% cocoa ingredient, i.e., cocoa powder or cocoa liquor; lecithin and vanillin to the amounts needed.

In the invention, the ice confection may be a portion, dome, bonbon, morsel, bar, stick bar. It can be extruded or molded.

For coating, the core to be coated preferably is at a low temperature of about −15° C. to −30° C. or lower. It may come from a molding line or from a freezing tunnel and is preferably pre-cooled.

The coating may conveniently be applied to the ice confection core by dipping, spraying or enrobing. The fat-based coating should be flowable and coatable at the temperature at which it is applied which may be from 25° to 45° C. and more usually from 30° to 40° C. If the temperature is too low, the coating may not flow and if the temperature is too high, e.g., 45° C., the coating may tend to slip off the ice cream without coating it properly and by causing excessive melting of the ice cream core.

EXAMPLES

The following Examples further illustrate the present invention. In these examples, parts and percentages are by weight, unless specified otherwise.

In these examples, bleeders were determined visually.

Examples 1–2

Molded ice cream centers (80% overrun) that are supported on a stick are made and maintained at −20° C. to −30° C. The bars weigh between 42–44 g each. These bars are cooled to a temperature of −20° C. to −30° C. and then are dipped into a coating having the composition shown in Table 2 and being maintained at 30° C. The quantity of coating taken up by bar is 12–15 g. The compositions of the coatings are set out in Table 1 below.

TABLE 1

| Ingredient | Example 1, % | Example 2, % |
|---|---|---|
| PMF 44, Intercontinental Speciality Fats (ISF) | 54.50 | 60.45 |
| Sugar | 25.408 | 25.238 |
| Cocoa liquor | 11.12 | — |
| Cocoa powder (10–12% fat) | — | 5.5 |
| Partially demineralized whey powder | 8.34 | 8.25 |
| Soy lecithin | 0.54 | 0.54 |
| Vanillin | 0.022 | 0.022 |

The number of bleeders and the degree of cracking were significantly less for the coating compositions of Examples 1 and 2 than those of a control coated ice cream bar using about 48% coconut oil and about 5% partially hydrogenated soybean oil as fats in the coating.

Example 3–8

Molded ice cream centers were treated as in Example 2 and dipped into the coatings of the composition of Example 3 except that the fat was as shown in Table 2 below.

TABLE 2

| Example | Replacement of soft PMF with palm hardened palm oil | Setting time (s) |
|---|---|---|
| 3 | 0% hardened palm oil, 100% soft PMF | 22 |
| 4 | 0.5% hardened palm oil, 99.5% soft PMF | 19 |
| 5 | 1% hardened palm oil, 99.5% soft PMF | 21 |
| 6 | 1.5% hardened palm oil, 98.5% soft PMF | 17 |
| 7 | 2% hardened palm oil, 98% soft PMF | 16 |
| 8 | 3% hardened palm oil, 97% soft PMF | 12 |

The crystallization time or setting time shown in Table 2 above is higher for a coating containing soft PMF (Example 3) as fat than the same coating with coconut oil, which is about 8.5 s, but it is still quite acceptable for the production lines. The crystallization time can be decreased by replacing a small quantity of soft PMF by hardened palm oil.

Upon observation, the mean number of bleeders per bar was very low, i.e., <1 to 2 bleeders, for the products of Examples 1–7 whereas it was 8.75 in the case of a coating made of refined coconut oil (values calculated for an average of 3 to 5 bars of each product).

Examples 9–10

Extruded ice cream centers (100% overrun) that were supported on a stick are made and maintained at −20° C. to −30° C. The bars weigh between 42–44 g each. These bars are cooled to a temperature of −20° C. to −30° C. and then are dipped into a coating having the composition shown in Table 3, which composition is maintained at 30° C. The quantity of coating taken up by bar is 12–15 g. The compositions of the coatings are set out in Table 3 below.

TABLE 3

| Ingredient | Example 9, % | Example 10, % |
|---|---|---|
| PMF 44, Intercontinental Speciality Fats (ISF) | 39.3 | 37.060 |
| Sugar | 35.375 | 33.534 |
| Whole milk powder | 13.400 | 10.990 |
| Cocoa liquor | 7.600 | 12.530 |
| Cocoa powder (10–12% fat) | — | 3.530 |
| Partially demineralized whey powder | 3.700 | 2.070 |

TABLE 3-continued

| Ingredient | Example 9, % | Example 10, % |
|---|---|---|
| Soy lecithin | 0.600 | 0.266 |
| Vanillin | 0.025 | 0.020 |

In these experiments, a soft type PMF with a melting point of 26° C. had a mean number of bleeders of <1/ice cream bar. In comparison, a hard PMF with a melting point between 32–36° C. showed around 25 bleeders/ice cream bar.

Other fats commonly used in ice cream coatings, such as coconut oil, palm kernel oil and blends of coconut oil with softer non-lauric vegetable oils, e.g., partially hydrogenated soybean oil, presented intermediate values of number of bleeders.

A sensory analysis was conducted using the extruded bars. Different combinations of hardness at 0° C. and melting points was compared with a chocolate coating for ice cream which is used in the trade and a chocolate used in confectionery. A trained panel described the flavor and texture profiles. The low hardness at 0° C., i.e., low solid fat content and low melting point of soft PMF was the closest to the confectionery chocolate for flavor and texture. This means that a coating containing a soft PMF melts in the mouth in a similar way as chocolate does at room temperature.

What is claimed is:

1. An ice confection comprising an ice confection core and an edible fat-based outer coating layer, in which the fat of the coating comprises a palm mid fraction with a melting point of about 26° C. in an amount sufficient to reduce or prevent core bleed through the coating from when the ice confection is manufactured through distribution.

2. An ice confection according to claim 1 wherein the ice confection core is molded ice cream or an extruded ice cream.

3. An ice confection according to claim 2 which is in the form of a portion, a dome, a bar, a morsel, a bonbon or a stick bar.

4. An ice confection according to claim 1 wherein the edible fat-based outer coating layer is based on soft palm mid fraction alone or in admixture with other fats, with the soft palm mid-fraction representing at least about 5% by weight of the fat in the coating.

5. An ice confection according to claim 4 wherein the balance of the fats in the coating consist of a hardened palm oil obtained by fractionation.

6. An ice confection according to claim 4 wherein the soft palm mid fraction has a slip melting point of between 22° and 30° C. and an iodine value between 40 and 52.

7. An ice confection according to claim 4 wherein the soft palm mid fraction has a solid fat content in weight % as measured by pulsed NMR with the measurement made without any tempering or temperature preconditioning at the temperature indicated of:

| ° C. | % |
|---|---|
| 0 | 75–85 |
| 10 | 65–80 |
| 20 | 45–60 |
| 25 | 10–25 |
| 30 | 0–5 |
| 35 | 0. |

8. An ice confection according to claim 4 wherein the soft palm mid fraction represents at least 97% by weight of the fat in the coating and the balance consists of a hardened palm oil obtained by hydrogenation.

9. An ice confection according to claim 4 wherein the coating is dark, milk or white chocolate or a compound coating or substitute thereof.

10. An ice confection according to claim 1 wherein, upon consumption, the fat-based coating, when associated with ice cream at about 0° C., melts in the mouth in a similar way as chocolate does at room temperature.

11. A method for reducing or preventing pinholes in fat-based ice cream coatings or reducing or preventing bleeding of melted ice cream from the core through the coating of a coated ice cream product, which comprises applying a fat-based outer coating layer to an ice confection core, in which the fat of the coating comprises a soft palm mid fraction with a melting point of about 26° C. and is present in an amount sufficient to reduce or prevent pinholes or core bleed through the coating from when the ice confection is manufactured through distribution.

12. A method according to claim 11 wherein the coating is applied to the ice confection by dipping, spraying, or enrobing.

13. A method according to claim 11 which further comprises precooling the core and then applying the fat-based coating onto the core at a temperature from 25° to 45° C.

14. A method according to claim 11 wherein the soft palm mid fraction has a slip melting point of between 22° and 30° C. and an iodine value between 40 and 52.

15. A method according to claim 12 wherein the soft palm mid fraction has a solid fat content in weight % as measured by pulsed NMR, with the measurement made without any tempering or temperature preconditioning at the temperature indicated, of:

| ° C. | % |
|---|---|
| 0 | 75–85 |
| 10 | 65–80 |
| 20 | 45–60 |
| 25 | 10–25 |
| 30 | 0–5 |
| 35 | 0. |

* * * * *